Aug. 8, 1967  W. KOHLHAGEN  3,335,377
METHOD AND APPARATUS FOR MAGNETIZING PERMANENT-MAGNET
ROTORS FOR SYNCHRONOUS REACTION MOTORS
Filed April 20, 1964  2 Sheets-Sheet 1
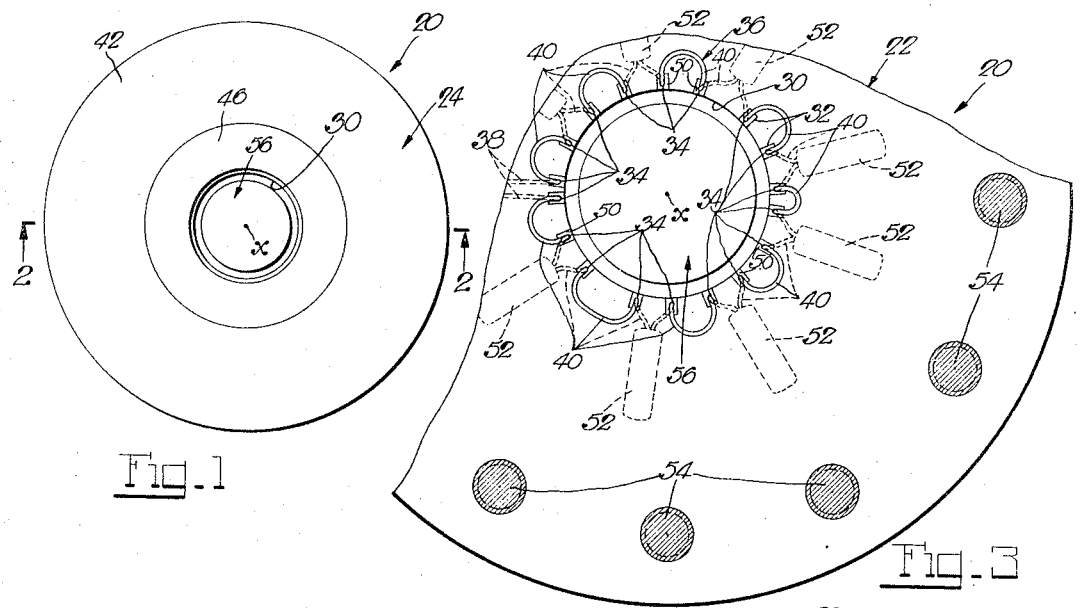
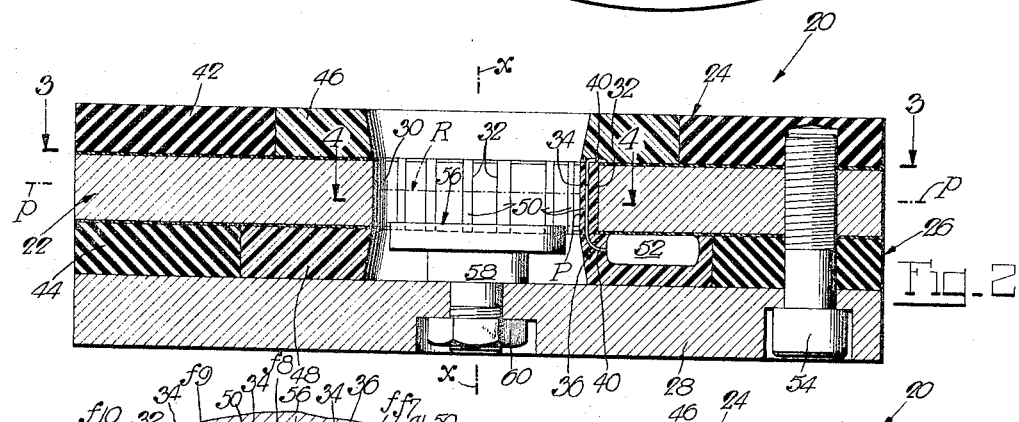
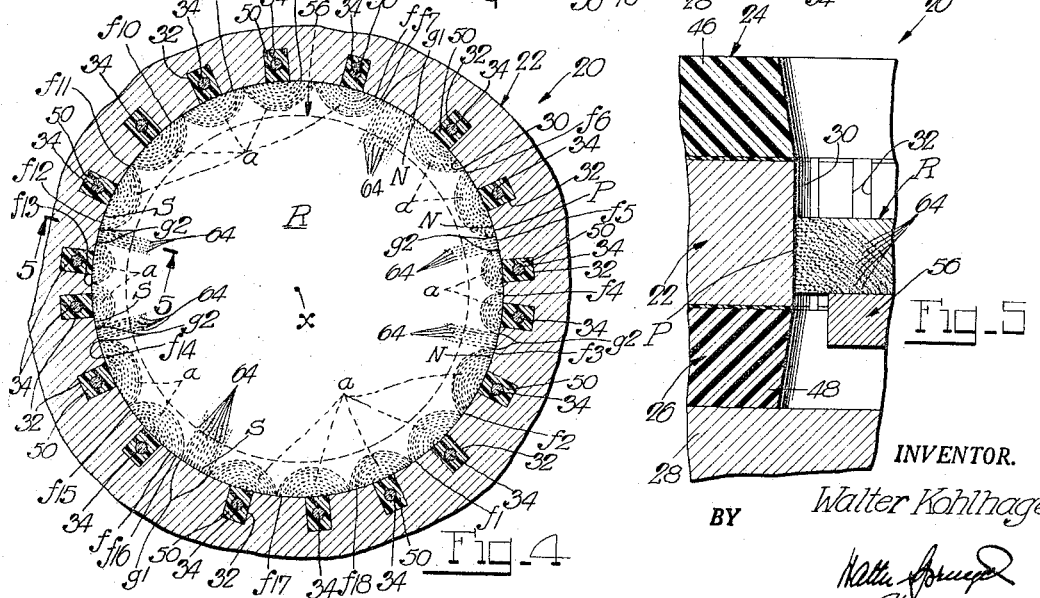
INVENTOR.
Walter Kohlhagen
BY
Attorney.

Aug. 8, 1967       W. KOHLHAGEN       3,335,377
METHOD AND APPARATUS FOR MAGNETIZING PERMANENT-MAGNET
ROTORS FOR SYNCHRONOUS REACTION MOTORS
Filed April 20, 1964                          2 Sheets-Sheet 2
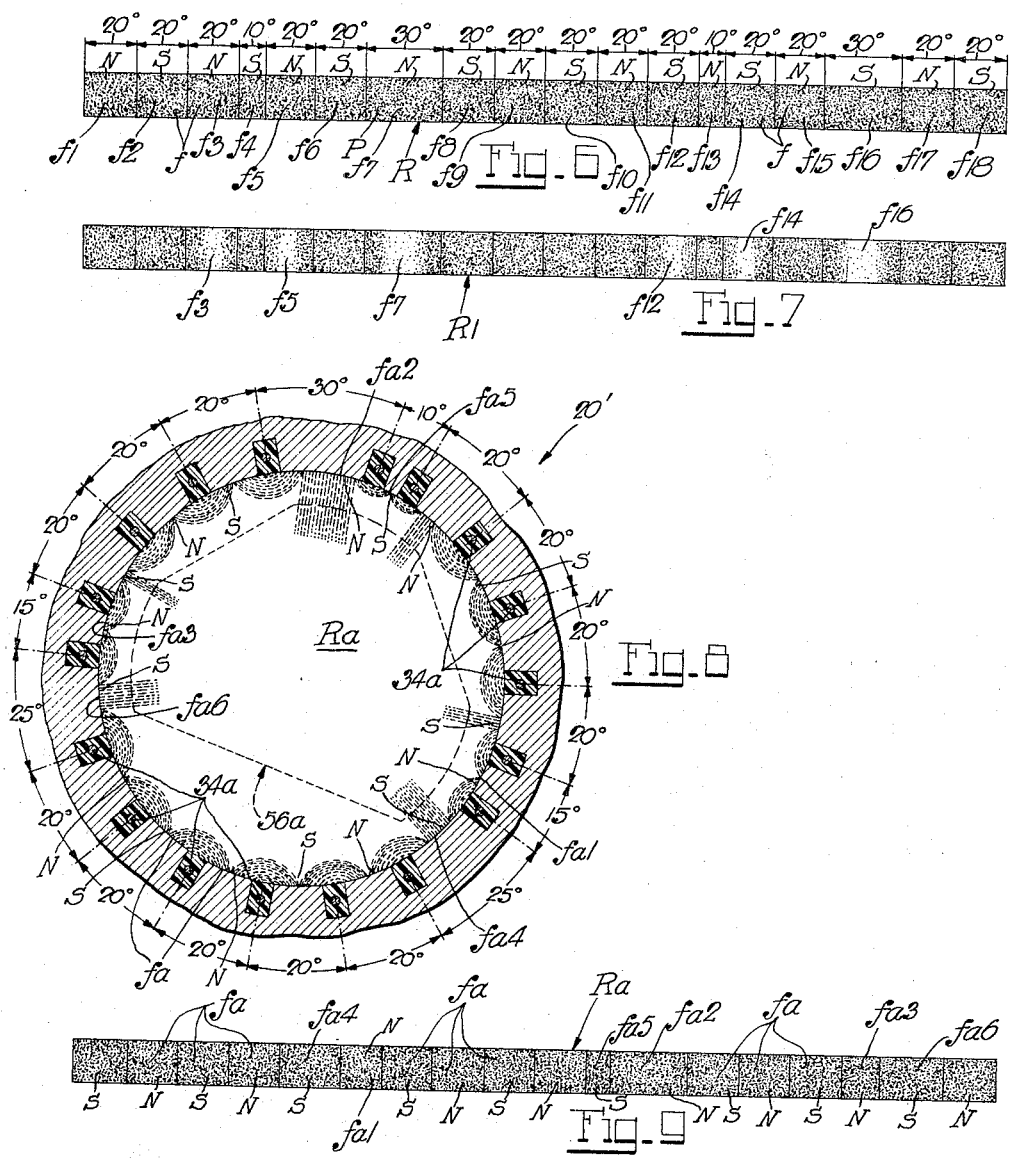
INVENTOR.
Walter Kohlhagen
BY
Attorney.

United States Patent Office 3,335,377
Patented Aug. 8, 1967

3,335,377
METHOD AND APPARATUS FOR MAGNETIZING PERMANENT-MAGNET ROTORS FOR SYNCHRONOUS REACTION MOTORS
Walter Kohlhagen, 818 Oakley Ave., Elgin, Ill. 60120
Filed Apr. 20, 1964, Ser. No. 360,953
13 Claims. (Cl. 335—284)

This invention relates to rotors for synchronous reaction motors and to permanent magnetization of such rotors.

The rotors with which the present invention is concerned have on their peripheries as many, or nearly as many, pole faces as there are field poles in the associated stators in order to make the fullest possible use of the field pole flux at any instant for optimum rotor torque and motor efficiency. This requires that adjacent pole faces of rotors of this type are of opposite polarity, which leaves the effective pole face magnets in the rotors very short, being only of the extent of the scalloped flux paths between adjacent pole faces of opposite polarity owing to the accustomed mode of permanent impression of the latter on the rotor peripheries. In order to obtain on rotors of this type pole faces of optimum magnetic strength despite their short magnets, these rotors are preferably made of materials of high magnetic field intensity, sometimes referred to as "high H" materials, such as barium ferrite, Arnox and Indox, for example.

The pole faces on rotors of this type are impressed on the peripheries thereof in a magnetizer which customarily provides a ferromagnetic plate with a central aperture for insertion therein of a rotor in substantially fitting fashion, and an insulated electrical conductor which is mounted in the plate and has in close proximity to the periphery of an inserted rotor active lengths of which successive ones around the rotor periphery are interlinked on opposite sides of the rotor. On passing a DC pulse of adequately high amperage through the conductor, the ensuing magnetic circuits in the plate and inserted rotor about the active conductor lengths impress the pole faces on the rotor periphery, with the pole faces being delineated by the active conductor lengths and their peripheral widths correspond to the angular spacing of the latter from each other. The pole faces are thus formed by magnetization of the rotors which may aptly be called "peripheral" magnetization in contrast to well-known "radial" magnetization of other types of rotors over their diameters, and the ensuing flux at the pole faces may, therefore, aptly be called "peripheral" flux.

While rotors of this type are highly advantageous owing to their large number of pole faces and their extent in virtually unbroken succession, or nearly so, around the rotor periphery, they do have a few shortcomings that adversely affect the rotor's performance in the vital respect of assured self-starting, especially under load. Thus, rotors of this type have for self-starting purposes unbalance in their pole face arrangement, i.e., a few, usually, of the pole faces are of different width than the remaining pole faces. These pole faces of different width are heavily relied on for a self-start of these rotors since they are primarily the ones which in any rotor repose position are out of alignment with the adjacent field poles, with most, or all, of the other pole faces being then in alignment with their adjacent field poles owing to retentive polarity of the latter until the next field excitation. Yet, it is the unbalance in the pole face arrangement which leaves the very pole faces relied on for rotor self-starting, and also a few other pole faces, magnetically weaker than the remaining pole faces on the aforementioned peripheral magnetization of the rotors. This is due to the fact that flux at substantial saturation level at and passing from normal-width pole faces to adjacent "starting" pole faces of greater width is below saturation level at the latter pole faces owing to their larger area. Conversely, flux at substantial saturation level at and passing from pole faces of smaller width to adjacent normal-width pole faces is below saturation level at the latter pole faces owing to their larger area. It is for these reasons inevitable that in any rotor of this type some starting as well as normal pole faces are not only weaker, but are also less sharply defined, than the other pole faces, which naturally has adverse effects on the rotor's performance in point of assured self-starting and also production of running as well as starting torque.

It is among the objects of the present invention to provide a rotor of this type which in its performance as a self-starter and torque producer is quite superior to prior rotors of this type, by having all of its pole faces of substantially the same optimum magnetic strength and equally sharply defined despite any differences in their widths.

It is another object of the present invention to provide a rotor of this type which has the aforementioned superior performance, yet its cost must be no more than that of prior rotors of this type.

It is a further object of the present invention to provide a rotor of this type, all pole faces of which are of the same optimum magnetic strength and equally sharply defined as aforementioned, by augmenting below-saturation flux at any pole face resulting from the aforementioned peripheral rotor magnetization with additional flux which is adequate to bring the overall flux thereat to, or at least closer to, saturation level and which results from additional, other than peripheral magnetization of the rotor.

Another object of the present invention is to provide a rotor of this type in which the aforementioned augmenting flux is like radial flux, except that it extends radially substantially over a peripheral margin only of the rotor and, hence, may aptly be termed "interrupted radial flux" in contrast to commonly understood radial flux which is uninterrupted across a rotor. This interrupted radial flux greatly augments the length of the magnets of the respective pole faces and thus lends to the latter magnetic strength which is at least equal to that of the other pole faces.

A further object of the present invention is to devise a method of magnetizing a rotor of this type according to which the aforementioned peripheral and other than peripheral magnetizations thereof for producing peripheral and interrupted radial flux therein are undertaken concurrently during the brief interval of normal peripheral magnetization.

It is another object of the present invention to devise a method of magnetizing a rotor of this type according to which, in addition to the aforementioned peripheral magnetization, the same is also magnetized for augmenting flux at the weaker pole faces, by interrupted radial magnetization, concurrently with the DC pulse, of first and second pole faces of opposite polarities, respectively, and of less flux density than others, on producing with the available ampere turns other magnetic circuits across said first and second pole faces by providing a magnetic path of lower than rotor reluctance and in shunt with the rotor between surface areas thereof which are in substantial radial alignment with, and preferably spaced inwardly from, said first and second pole faces, respectively. In thus shunting flux around considerable lengths of the rotor via the low-reluctance by-path, the reluctance of these other magnetic circuits remains sufficiently low to produce the latter at a reasonable number of ampere turns adequate for peripheral rotor magnetization alone. Interrupted radial magnetization of pole faces in this wise is remarkable, considering that it is virtually impossible to magnetize rotors of preferred high H material radially across the periphery, for to do so would require a prohibitively large number of ampere turns which is way outside practicality.

Another object of the present invention is to provide a rotor of this type with the aforementioned unbalanced pole face arrangement, of which all pole faces become substantially flux-saturated in the course of the rotor's magnetization according to the aforementioned method, by designing the pole faces so that the overall area of all pole faces of one polarity is substantially equal to the overall area of all pole faces of the other polarity.

It is a further object of the present invention to provide a structurally simple, yet accurately performing, magnetizer in which to magnetize rotors of this type in accordance with the aforementioned method.

Other objects and advantages will appear to those skilled in the art from the following, considered in conjunction with the accompanying drawings.

In the accompanying drawings, in which certain modes of carrying out the present invention are shown for illustrative purposes:

FIG. 1 is a plan view of a magnetizer according to the invention;

FIG. 2 is an enlarged section through the magnetizer taken substantially on the line 2—2 of FIG. 1;

FIG. 3 is a fragmentary section through the magnetizer taken substantially on the line 3—3 of FIG. 2;

FIG. 4 is an enlarged fragmentary section through the magnetizer as taken on the line 4—4 of FIG. 2, showing therein a rotor magnetized according to a method of the present invention;

FIG. 5 is a fragmentary section taken on the line 5—5 of FIG. 4;

FIG. 6 is a view of a rotor which also embodies the present invention, with the rotor being shown, for clarity of illustration, as though its periphery were linear;

FIG. 7 is a view of a rotor generally similar to the rotor of FIG. 6 but lacking the inventive aspects of the latter rotor;

FIG. 8 is a fragmentary section through a modified magnetizer and also a modified rotor; and FIG. 9 is a view of the modified rotor of FIG. 8, with the rotor being illustrated in the same manner as the rotors of FIGS. 6 and 7.

Referring to the drawings, and more particularly to FIGS. 1 to 5, the reference numeral 20 designates a magnetizer for impressing the pole faces on the peripheries of rotors of permanent-magnet material. The magnetizer has a ferromagnetic plate 22, sometimes referred to as a "field plate," which is sandwiched between heavy insulation 24 and 26 and mounted on a base plate 28 (FIG. 2), with the field plate 22 having an aperture 30 of exemplary circular outline about an axis $x$ for reception of a rotor R with its periphery P fitting therein preferably as closely as possible for the least air gap between them. The field plate 22 is further provided with spaced grooves 32 which extend transversely of, and in this instance normal to, the median plane $p$ of the field plate and receive active lengths 34 of an electrical conductor 36 the opposite leads 38 of which are adapted for connection with a DC source (FIG. 3). The conductor 36 is wound on the field plate 22 around the aperture 30 therein in usual, generally serpentine fashion, i.e., the conductor parts 40 connecting the active conductor lengths 34 in successive grooves 32 around the aperture 30 are alternately disposed on the opposite faces of the field plate 22 (FIG. 3), so that direct current applied to the conductor 36 will pass through successive active lengths 34 thereof in opposite directions. The conductor 36 must be well insulated from the field plate 22 owing to the large current passing therethrough for rotor magnetization. To this end, the insulation 24 and 26 on the opposite, preferably insulation-coated, faces of the field plate 22 consists, in this instance, of shaped rings 42 and 44 of Bakelite or the like, and fillers 46, 48 and 50 of a preferably clear epoxy resin which are conveniently cast separately in the shaped rings 42 and 44 and in the grooves 32 in the field plate 22, respectively, with the conductor parts 40 and the active conductor lengths 34 being first located on the opposite faces of and in the grooves 32 in the field plate so as to become embedded in the epoxy fillers 46, 48 and 50. More particularly, the active conductor lengths 34 are located in the grooves 32 in fairly close proximity to the periphery of an inserted rotor R (FIGS. 2 and 4), and extend therein in this instance normal to the median plane $p$ of the field plate to delineate rotor pole faces $f$ of exemplary rectangular shape (FIG. 6). Further, to facilitate assembly of the conductor 36 with the field plate 22 in general, and accurate location of the active conductor lengths 34 in the grooves 32 in particular, the conductor 36 is in this instance made up of separate lengths which after the finished assembly of the active conductor lengths 34 with the field plate are joined and soldered at 52 adjacent one of the faces of the latter, in this instance the bottom face thereof, prior to applying the epoxy filler 48 (FIGS. 2 and 3). Suitable bolts 54 serve to mount the field plate 22 with its opposite insulation 24 and 26 to the base plate 28.

The magnetizer described so far is suited for normal peripheral magnetization of an inserted rotor. In accordance with an important aspect of the present invention, however, the present magnetizer will magnetize an inserted rotor peripherally, as well as radially interrupted under certain conditions to-be-described. To this end, the present magnetizer is also provided with a ferromagnetic flux path or bridge 56 which in this instance is a circular disc on a shank 58 that is mounted on the base plate 28 by a nut 60. The ferromagnetic disc 56 is concentric with, but preferably of smaller diameter than, the plate aperture 30, and in this instance projects slightly into the latter so as to be in face-to-face engagement with an inserted rotor preferably somewhat within the axial confines of this plate aperture (FIG. 2). With the exemplary magnetizer being normally used in horizontal disposition, the disc 56 further serves advantageously as the sole support for an inserted rotor.

Featured combined peripheral and interrupted axial magnetization of a rotor is particularly advantageous if at least some of the contemplated pole faces of a rotor are of different peripheral widths than others and there are among the pole faces of different widths those of opposite polarity, with combined peripheral and interrupted axial magnetization of a rotor affording the ultimate in advantages if the overall area of the contemplated pole faces of one polarity is also equal, or substantially equal, to the overall area of the contemplated pole faces of the other polarity. In the exemplary magnetizer 20, the active conductor lengths 34 which delineate the pole faces $f1$ to $f18$ on the inserted rotor R are spaced apart the indicated peripheral widths, in degrees, the same as pole faces $f1$ to $f18$ on the rotor periphery in FIG. 6, meaning that the overall areas of the contemplated pole faces of one polarity and of the other polarity, respectively, are equal, since successive pole faces will be of opposite polarity owing to the mode of their magnetization, and they may be of the assumed polarities indicated in FIG. 6. Further, in the exemplary contemplated pole face arrangement there are in each group of pole faces of the same polarity two pole faces of different, larger and smaller, peripheral widths $f7$, $f16$ and $f4$, $f13$, respectively, than the remaining pole faces which are of identical widths.

To impress the pole faces on the periphery of the inserted rotor R of permanent-magnet material in accordance with the exemplary arrangement of the active conductor lengths 34 (FIG. 4), there is applied to the conductor 36 a DC pulse to produce in the rotor and surrounding field plate "primary" magnetic circuits about the respective conductor lengths 34, with flux flow being in opposite directions in successive circuits to impart opposite polarities to successive pole faces (FIG. 6). The ensuing "peripheral" flux in the rotor is indicated in FIG. 4 by the dotted-line scalloped rotor regions denoted by the reference character a. The amperage of the applied DC pulse is in any event adequate to achieve in these magnetic circuits at least in part preferred substantial flux saturation. As a result, and as will be observed from FIG. 4, substantial flux saturation with peripheral flux will occur at all pole faces except at the pole faces f7 and f16 of largest widths and at the pole faces f3, f5 and f12, f14 next to the pole faces f4 and f13, respectively, of smallest widths. This is due to the fact that the peripheral flux a passing in the rotor between the largest-width pole faces f7, f16 and their next adjacent normal-width neighbors, while being at substantial saturation density or level at the latter pole faces, is of less than saturation level at the largest-width pole faces owing to their greater areas, leaving at the latter pole faces theoretical gaps g1 which require additional flux at substantial saturation level in order to attain substantial flux saturation at these pole faces. On the other hand, peripheral flux a passing in the rotor between the smallest-width pole faces f4, f13 and their next adjacent normal-width pole faces, while being at substantial saturation level at the smallest-width pole faces, are of less than saturation level at these normal-width pole faces, leaving at the latter pole faces theoretical gaps g2 which require additional flux at substantial sautration level in order to attain substantial flux saturation at these normal-width pole faces.

In accordance with another important aspect of the present invention, the "peripheral" flux at the above-mentioned non-saturated pole faces is augmented with sufficient interrupted radial flux to attain thereat substantial flux saturation. To this end, there must also be produced in the rotor and surrounding field plate additional or "secondary" magnetic circuits across the non-saturated pole faces of opposite polarity which, besides secondary flux paths in the field plate, would ordinarily involve also secondary flux paths within the rotor between these pole faces, with these secondary flux paths being in any event of quite considerable lengths and even equal to the rotor diameter at the exemplary pole face arrangement (FIG. 4). However, with the rotors being preferably of a high H material, it would be most difficult to produce flux of sufficient density across the rotor periphery. In this connection, and as already mentioned, it is virtually impossible to magnetize rotors of high H material radially, for to do so would require a prohibitively large number of ampere turns which is way outside practicality.

It is by virtue of the ferromagnetic disc 56 of low reluctance that there will be produced with a reasonable number of applied ampere turns, in addition to the described primary magneic circuits about the individual active conductor lengths 34, also secondary magnetic circuits across the non-saturated pole faces of opposite polarity, in that the disc 56 serves to shunt the flux around the rotor over the far greater parts of the secondary magnetic paths thereacross between the non-saturated pole faces of opposite polarity, with the reluctance of the secondary magnetic circuits being thus incomparably lower than it would be if these secondary magnetic paths were confined solely in the rotor. Of course, in order permanently to retain in the rotor interrupted radial flux 64 advantageously to some considerable depth inwardly from the rotor periphery at the originally non-saturated pole faces for correspondingly high magnetic strength of the ensuing additional magnets thereat, the disc 56 is with its periphery kept correspondingly spaced from the rotor periphery (FIGS. 2 and 4). The secondary magnetic circuits thus produced, in addition to the primary magnetic circuits, on passage of a DC pulse of adequate amperage through the conductor 36 (FIG. 4), have between the non-saturated pole faces f3, f5, f7 of one polarity and the non-saturated pole faces f12, f14, f16 of the opposite polarity flux paths extending from these pole faces of opposite polarities radially inwardly in the rotor to the disc 56 as indicated by the flux 64 in FIG. 5, and then in and across the disc, with the return paths of these secondary magnetic circuits being in the field plate. Thus the flux 64 in the rotor between its periphery and the disc 56, while deviating from a radial direction farther away from the rotor periphery owing to its passage to and into the disc 56 in the course of magnetization as shown in FIG. 5, is aptly termed "interrupted radial" flux.

While in the exemplary magnetizer shown the disc 56 is with its periphery spaced radially inwardly from the rotor-receiving aperture 30 in the field plate 22, it is, of course, fully within the purview of the present invention to make the disc 56 of larger diameter, and even of the same diameter as the aperture 30, and still achieve interrupted radial rotor magnetization, though to a smaller depth. Further, if the base plate 28 is ferrous, rather than nonferrous, the return paths of the secondary magnetic circuits will be in the base plate 28, the ferrous bolts 54 and the field plate 22 (FIG. 2).

Since in the exemplary rotor R of FIG. 4 the overall areas of the pole faces of one polarity and of the other polarity, respectively, are also equal, or substantially equal, as described, the augmenting interrupted radial flux at the non-saturated pole faces is of substantially the same density, and is at substantial saturation level if the applied ampere turns are sufficiently high to that end, in which case all pole faces are substantially flux-saturated as depicted by the evenly stippled pole face areas of the rotor in FIG. 6. Also, the pole faces f of this rotor are shown continuous with each other in FIG. 6, and they are to all practical intents and purposes continuous with each other at their delineation by the active conductor lengths 34 in the magnetizer which to this end are kept at minimum cross-sectional dimension.

In thus providing the low-reluctance flux by-path 56 around part of the rotor, the overall reluctance of the primary and secondary magnetic circuits involved in the rotor magnetization may readily be kept at a magnitude at which these magnetic circuits will be produced, even to substantial flux saturation of all pole faces, at a reasonable number of applied ampere turns, resulting from the application to the active conductor lengths 34 of a DC pulse within a range of from 1000 to 2500 amperes, for example, for rotors of high H material and of most practical sizes.

The rotor R thus magnetized (FIG. 6) has pole faces f which despite considerable differences in the peripheral widths of some of them are substantially flux-saturated and, hence, of substantially the same optimum magnetic field intensity per unit area, with the pole faces being, moreover, defined with optimum sharpness owing to their delineation by the narrow conductor lengths 34, and further owing to their substantial flux saturation and, hence, flux crowding, all of which are highly desirable properties of a rotor to the end of achieving assured self-starting and optimum running as well as starting torque. The rotor R of FIG. 6, having the peripheral surface P and opposite end surfaces (FIG. 5), is also characterized in that each of at least two pole faces of opposite polarities on one of the rotor surfaces, for example each of the pole faces f7 and f16 on the peripheral rotor surface P (FIGS. 6 and 4), has flux passing to the next adjacent pole faces of opposite polarity, in this example to the respective adjacent pole faces f6, f8 and f15, f17 (FIGS. 6 and 4), and has also additional flux passing to a rotor surface other than said one surface, in this example the flux 64 passing from the peripheral pole faces f7 and f16 to the end surface of the rotor with which it rested on the disc 56 in the course of its magnetization (FIGS. 4 and 5). Substantial flux saturation at all pole faces is even attained despite inevitable air gaps between the rotor and surrounding field plate which usually vary locally around the rotor and vary even further with inevitable tolerances in the shape and size of the rotors. This is due to the fact that the interrupted radial flux will more readily bridge an air gap at places where peripheral flux will do so less readily. In contrast thereto, a modified rotor R1 of the same material magnetized in the same magnetizer but without the flux by-path 56, is shown in FIG. 7 with all its weaknesses, i.e., the pole faces f3, f5, f7, f12, f14 and f16 are non-saturated and of smaller magnetic field intensity per unit area than the remaining pole faces as depicted by their less dense stippling, wherefore they constitute weak pole faces which, moreover, are not as sharply defined as the other pole faces owing to the less crowded condition of the flux thereat. The modified rotor R1 is thus considerably inferior to the featured rotor R of FIG. 6 in the respects of assured self-starting and magnitudes of running as well as starting torque.

While the exemplary rotor R of FIGS. 4 and 6 has substantial flux saturation at all pole faces because of their arrangement such that the overall areas of the pole faces of one polarity and of the other polarity, respectively, are substantially equal, another rotor with unequal overall areas of its respective N and S pole faces and with different-width pole faces of opposite polarity may be magnetized with the same advantages, except that one or more of the different-width pole faces may not be fully flux-saturated, as will be readily understood. The present magnetizer with the featured flux by-path 56 may even be used to advantage for magnetizing a rotor all pole faces of which are contemplated to be of substantially the same peripheral width, since the interrupted radial flux will more often than not augment at pole faces the peripheral flux where the same alone fails to achieve substantial flux saturation thereat owing to inaccurate spacing of one or more of the active conductor lengths in the magnetizer, or air gaps of locally varying width between rotor and surrounding field plate, or local spots of different permeability in the rotor material. The present magnetizer may also be used to advantage for magnetizing a rotor which lacks one or more pole faces at a place or places adjacent one or more active conductor lengths of correspondingly large cross-section in the magnetizer, for example. Also, while the rotors to be magnetized in the present magnetizer are of preferred high H material, it is, of course, fully within the purview of the present invention to magnetize in the present magnetizer rotors of lower H materials with the same advantages.

Reference is now had to FIG. 8 which shows a magnetizer 20' that has a modified ferromagnetic flux by-path 56a, and also an arrangement of the active conductor lengths 34a for delineating pole faces fa of somewhat different arrangement on the periphery of a rotor Ra (FIG. 9). Thus, the active conductor lengths 34a are angularly spaced apart as indicated in FIG. 8 to delineate pole faces of the relative peripheral widths shown in FIG. 9, with three pole faces of each polarity, in this instance the pole faces fa1, fa2, fa3 of exemplary N polarity and the pole faces fa4, fa5, fa6 of exemplary S polarity, being of different widths than the remaining pole faces, and the three different-width pole faces of one polarity being of different relative widths than the three different width pole faces of the other polarity. Nevertheless, with the overall areas of the pole faces of the one polarity and of the other polarity, respectively, being equal in the exemplary rotor Ra, featured peripheral and interrupted radial magnetization of the same will result in pole faces fa all of which are of substantially the same magnetic field intensity per unit area, and will be substantially flux-saturated on providing adequate ampere-turns for the purpose, as will be readily understood.

The modified ferromagnetic flux by-path 56a, rather than being a circular disc, is in form of a plate shaped the same or similarly as shown in FIG. 8 to provide the major lengths of the flux paths across the rotor between those pole faces only that require augmenting interrupted radial flux to bring them to the same strength as the remaining pole faces and across which the aforementioned secondary magnetic circuits extend for this purpose.

Magnetization of rotors of permanent-magnet material peripherally as well as interupted radially in the featured magnetizer is in accordance with a method which also embodies the present invention. According to this method, a rotor is, in addition to peripheral magnetization, further magnetized for augmenting flux at weaker pole faces, by interrupted radially magnetizing, concurrently with the DC pulse, of first and second pole faces of opposite polarities, respectively, and of lower flux density than others, on producing with the available ampere turns other magnetic circuits across said first and second pole faces by providing a magnetic path of lower than rotor reluctance and in shunt with the rotor between surface areas thereof which are in substantial radial alignment with, and preferably spaced inwardly from, said first and second pole faces, respectively.

While in the described rotors 20 and 20' the pole faces are provided in the more usual manner on the rotor periphery, it is, of course, also within the purview of this invention to provide these pole faces on one of the rotor faces. This could readily be achieved by locating the active conductor lengths in proper configuration in the face of a plate at the general location of the plate 56 in FIG. 2, for example, in which case the ring plate 22 would become the low-reluctance flux path for the secondary magnetic circuits, as will be readily understood.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A method of magnetizing a rotor of permanent-magnet material in a peripherally surrounding ferromagnetic plate with lengths of an electrical conductor adjacent and spaced around the rotor periphery to delineate thereon pole faces of which at least some of opposite polarity are of different peripheral widths, with successive conductor lengths being interlinked on opposite sides of the rotor, which involves impressing the pole faces on the rotor by producing magnetic circuits around the conductor lengths on passing through the conductor a DC pulse of an amperage to provide a given number of ampere turns for each conductor length, whereby first and second pole faces of opposite polarities, respectively, have less flux density than others, that improvement which comprises, concurrently with the DC pulse further magnetizing said first and second pole faces on producing with the given number of ampere turns other magnetic circuits across said first and second pole faces by providing a magnetic path of lower than rotor reluctance and in shunt with the rotor between surface areas thereof adjacent and in substantial radial alignment with said first and second pole faces, respectively.

2. A method of magnetizing a rotor of permanent-magnet material in a peripherally surrounding ferromagnetic plate with lengths of an electrical conductor adjacent and spaced around the rotor periphery to delineate thereon pole faces of which at least some of opposite polarity are of different peripheral widths, with successive conductor lengths being interlinked on opposite sides of the rotor, which involves impressing the pole faces on the rotor by producing magnetic circuits around the conductor lengths on passing through the conductor a DC pulse of an amperage to provide for each conductor length a given number of amper turns adequate to produce substantial flux saturation in pole faces of smaller peripheral width than others, whereby first and second pole faces of opposite polarities, respectively, have less flux density than others, that improvement which comprises, concurerntly with the DC pulse further magnetizing said first and second pole faces on producing with the given number of ampere turns other magnetic circuits across said first and second pole faces by providing a magnetic path of lower than rotor reluctance and in shunt with the rotor between surface areas thereof spaced inwardly from and in substantial radial alignment with said first and second pole faces, respectively.

3. A method of magnetizing a rotor of permanent-magnet material in a peripherally surrounding ferromagnetic plate with lengths of an electrical conductor adjacent and spaced around the rotor periphery to delineate thereon pole faces of which the overall areas of the pole faces of one polarity and of the other polarity, respectively, are substantially equal and at least some pole faces of both polarities are of different peripheral widths, with successive conductor lengths being interlinked on opposite sides of the rotor, which involves impressing the pole faces on the rotor by producing magnetic circuits around the conductor lengths on passing through the conductor a DC pulse of an amperage to provide a given number of ampere turns for each conductor length, whereby first and second pole faces of opposite polarities, respectively, have less flux density than others, that improvement which comprises, concurrently with the DC pulse further magnetizing said first and second pole faces on producing with the given number of ampere turns other magnetic circuits across said first and second pole faces by providing a magnetic path of lower than rotor reluctance and in shunt with the rotor between surface areas thereof spaced inwardly from and in substantial radial alignment with said first and second pole faces, respectively, with the given number of ampere turns being adequate to achieve substantial flux saturation at all pole faces.

4. A method of magnetizing a rotor of permanent-magnet material in a peripherally surrounding ferromagnetic plate with lengths of an electrical conducor adjacent and spaced around the rotor periphery to delineate thereon pole faces of which the overall areas of the pole faces of one polarity and of the other polarity, respectively, are substantially equal and at least some pole faces of both polarities are of different peripheral widths, with successive conductor lengths being interlinked on opposite sides of the rotor, which involves impressing the pole faces on the rotor by producing magnetic circuits around the conductor lengths on passing through the conductor a DC pulse of an amperage to provide a given number of ampere turns for each conductor length, whereby first and second pole faces of opposite polarities, respectively, have less flux density than others, that improvement which comprises, concurrently with the DC pulse further magnetizing said first and second pole faces on producing with the given number of ampere turns other magnetic circuits across said first and second pole faces by holding the rotor with one end face thereof against a ferromagnetic disc of lower than rotor reluctance and concentric with but inwardly spaced from the rotor periphery, with the given number of ampere turns being adequate to achieve substantial flux saturation at all pole faces.

5. A method of magnetizing a rotor of high magnetic field intensity material in a peripherally surrounding ferromagnetic plate with lengths of an electrical conductor adjacent and spaced around the rotor periphery to delineate thereon pole faces of which at least some of opposite polarity are of different peripheral widths, with successive conductor lengths being interlinked on opposite sides of the rotor, which comprises, impressing the pole faces on the rotor by producing magnetic circuits around the conductor lengths on passing through the conductor a DC pulse of an amperage to provide a given number of ampere turns for each conductor length, whereby first and second pole faces of opposite polarities, respectively, have less flux density than others; and concurrently with the DC pulse further magnetizing said first and second pole faces on producing with the given number of ampere turns other magnetic circuits across said first and second pole faces by providing a magnetic path of lower than rotor reluctance and in shunt with the rotor between surface areas thereof spaced inwardly from and in substantial radial alignment with said first and second pole faces, respectively.

6. A method of magnetizing a rotor of high magnetic field intensity material in a peripherally surrounding ferromagnetic plate with lengths of an electrical conductor adjacent and spaced around the rotor periphery to delineate thereon pole faces of which the overall areas of the pole faces of one polarity and of the other polarity, respectively, are substantially equal and at least some pole faces of both polarities are of different peripheral widths, with successive conductor lengths being interlinked on opposite sides of the rotor, which comprises, impressing the pole faces on the rotor by producing magnetic circuits around the conductor lengths on passing through the conductor a DC pulse of an amperage to provide a given number of ampere turns for each conductor length whereby first and second pole faces of opposite polarities, respectively, have less flux density than others; and concurrently with the DC pulse further magnetizing said first and second pole faces on producing with the given number of ampere turns other magnetic circuits across said first and second pole faces by providing a magnetic path of lower than rotor reluctance and in shunt with the rotor between surface areas thereof spaced inwardly from and in substantial radial alignment with said first and second pole faces, respectively, with the given number of ampere turns being adequate to achieve substantial flux saturation at all pole faces.

7. In a rotor magnetizer, the combination of a ferromagnetic plate lying in a plane and having an aperture for peripherally fitting insertion of a rotor, and grooves transverse to said plane and spaced peripherally around and open to said aperture, and an insulated electrical conductor having extending in said grooves in close proximity to the periphery of an inserted rotor, active lengths, respectively, delineating rotor pole faces and being interconnected so that direct current applied to said conductor will pass through active lengths in successive grooves in opposite directions, a flux bridge of lower reluctance than the rotor material mounted to have opposite ends located for engagement with surface areas of an inserted rotor adjacent and in substantial radial alignment with delineated pole faces of opposite polarities, respectively.

8. The combination in a rotor magnetizer as set forth in claim 7, in which said opposite ends of said flux bridge are located for engagement with surface areas of an inserted rotor which are spaced inwardly from the rotor periphery and in substantially radial alignment with delineated pole faces of opposite polarities, respectively.

9. The combination in a rotor magnetizer as set forth in claim 7, in which said plate lies in a substantially horizontal plane, and said bridge ends are near the lower end of said aperture to support an inserted rotor.

10. The combination in a rotor magnetizer as set forth in claim 7, in which said aperture is circular, and said bridge is an annular ferromagnetic disc concentric with and of smaller diameter than said aperture and has a face parallel to said plane for engagement with an inserted rotor.

11. The combination in a rotor magnetizer as set forth in claim 7, in which said active conductor lengths are at least in part spaced differently from each other to delineate rotor pole faces which at least in part are of different peripheral widths, said aperture is circular, and said bridge is an annular ferromagnetic disc concentric with and of smaller diameter than said aperture and has a face parallel to said plane for engagement with an inserted rotor.

12. The combination in a rotor magnetizer as set forth in claim 7, in which first and second ones of said active conductor lengths are spaced more and less, respectively, than the remaining ones to delineate rotor pole faces of greater and smaller peripheral widths, respectively, than the remaining pole faces, and said bridge ends are located for engagement of one bridge end with surface areas of an inserted rotor in substantial radial alignment at least with delineated first and second pole faces of one polarity which are of said greater widths and which are next to those of said smaller widths, respectively, and for engagement of the other bridge end with rotor surface areas in substantial radial alignment at least with said delineated first and second pole faces of the other polarity.

13. The combination in a rotor magnetizer as set forth in claim 7, in which first and second ones of said active conductor lengths are spaced more and less, respectively, than the remaining ones, and said active lengths number and are otherwise spaced, so that said active lengths delineate rotor pole faces of which a number are of greater and smaller peripheral widths than the remaining pole faces and the overall surface areas of the pole faces of one polarity and of the other polarity, respectively, are substantially equal, and said bridge ends are located for engagement of one bridge end with surface areas of an inserted rotor in substantial radial alignment at least with delineated first and second pole faces of one polarity which are of said greater widths and which are next to those of said smaller widths, respectively, and for engagement of the other bridge end with rotor surface areas in substantial radial alignment at least with said delineated first and second pole faces of the other polarity.

References Cited

UNITED STATES PATENTS

| | | | |
|---|---|---|---|
| 3,058,019 | 10/1962 | Eisler | 310—156 X |
| 3,158,797 | 11/1964 | Andrews | 335—284 |

BERNARD A. GILHEANY, *Primary Examiner.*

M. O. HIRSHFIELD, *Examiner.*

G. HARRIS, L.L. SMITH, *Assistant Examiners.*